(12) United States Patent
     Zhao et al.

(10) Patent No.: US 12,630,171 B2
(45) Date of Patent: May 19, 2026

(54) METHOD FOR CONTROLLING VEHICLE, RELATED APPARATUS AND UNMANNED VEHICLE

(71) Applicant: Beijing Baidu Netcom Science Technology Co., Ltd., Beijing (CN)

(72) Inventors: Haowei Zhao, Beijing (CN); Pengfei Zhang, Beijing (CN); Yuchen Sun, Beijing (CN); Yuqing Guo, Beijing (CN); Kuan Zhang, Beijing (CN); Lin Ma, Beijing (CN); Changchun Liu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 55 days.

(21) Appl. No.: 18/887,857

(22) Filed: Sep. 17, 2024

(65) Prior Publication Data

US 2025/0010870 A1      Jan. 9, 2025

(30) Foreign Application Priority Data

Jun. 14, 2024     (CN) .......................... 202410772496.8

(51) Int. Cl.
     *B60W 60/00*          (2020.01)
     *B60W 50/00*          (2006.01)
     *B60W 50/06*          (2006.01)

(52) U.S. Cl.
     CPC ........ *B60W 50/06* (2013.01); *B60W 50/0097* (2013.01); *B60W 60/00272* (2020.02); *B60W 2556/45* (2020.02); *B60W 2756/10* (2020.02)

(58) Field of Classification Search
     CPC ............. B60W 50/06; B60W 50/0097; B60W 60/00272; B60W 2556/45;
     (Continued)

(56) References Cited

U.S. PATENT DOCUMENTS

| | | | |
|---|---|---|---|
| 12,360,532 B2 * | 7/2025 | Qiu ...................... | G05D 1/0212 |
| 2021/0048823 A1 * | 2/2021 | Qiu ...................... | G05B 19/042 |

(Continued)

FOREIGN PATENT DOCUMENTS

| | | | |
|---|---|---|---|
| CN | 115285147 A * | 11/2022 | ........ B60W 60/0017 |
| CN | 120828794 A * | 10/2025 | |

OTHER PUBLICATIONS

Machine translation of CN-115285147-A.*

(Continued)

*Primary Examiner* — Robert T Primary Nguyen
(74) *Attorney, Agent, or Firm* — Knobbe, Martens, Olson & Bear, LLP

(57)          ABSTRACT

A method for controlling a vehicle, including: simulating and deducing, based on current state information between a target vehicle and a traffic participant, an interaction process between the target vehicle and the traffic participant to obtain an initial part of a cooperative game tree; updating, in response to there being a target leaf node that is capable of being expanded to obtain a target child node in the initial part, respective nodes on a deduction path from the root node to the target child node based on a path parameter of an updated predicted trajectory, to obtain a complete cooperative game tree composed of the initial part and the target child node; and determining a first control instruction of the target vehicle using the complete cooperative game tree, to control the target vehicle using the first control instruction.

20 Claims, 5 Drawing Sheets

(58) Field of Classification Search
CPC ......... B60W 2756/10; B60W 60/0027; B60W
60/001; G05D 1/695; G05D 1/6987;
G05D 2101/15; G05D 2105/22; G05D
2107/13; G05D 2109/10; G08G 1/0112;
G08G 1/0125; G08G 1/0129; G08G
1/0133; G08G 1/0145; G08G 1/164;
G08G 1/166; G08G 1/20; G06N 3/006;
G06N 5/042
See application file for complete search history.

(56) References Cited

U.S. PATENT DOCUMENTS

| | | | |
|---|---|---|---|
| 2023/0278593 A1* | 9/2023 | Wang | B60W 30/06 701/26 |
| 2023/0331217 A1* | 10/2023 | Wang | B60W 30/18009 |
| 2025/0128419 A1* | 4/2025 | Lai | B25J 9/1666 |
| 2025/0206342 A1* | 6/2025 | Caldwell | B60W 60/0011 |

OTHER PUBLICATIONS

Yang, S. M., & Lin, Y. A. (2021). Development of an improved rapidly exploring random trees algorithm for static obstacle avoidance in Autonomous Vehicles. Sensors, 21(6), 2244. https://doi.org/10.3390/s21062244 (Year: 2021).*

Zafar, A., Farokhi, F., & Cantoni, M. (2020). Linear quadratic control computation for systems with a directed tree structure. IFAC-PapersOnLine, 53(2), 6536â6541. https://doi.org/10.1016/j.ifacol.2020.12.069 (Year: 2020).*

Rego, C. (2001). Node-ejection chains for the vehicle routing problem: Sequential and parallel algorithms. Parallel Computing, 27(3) , 201â222. https://doi.org/10.1016/s0167-8191(00)00102-2 (Year: 2001).*

Shi, Y., Li, Q., Bu, S., Yang, J., & Zhu, L. (2020). Research on intelligent vehicle path planning based on rapidly-exploring random tree. Mathematical Problems in Engineering, 2020, 1â14. https://doi.org/10.1155/2020/5910503 (Year: 2020).*

Machine translation of CN-120828794-A.*

Extended European Search Report dated Oct. 28, 2025 in Application No. 25182426.4, 10 pages.

Fridovich-Keil et al., Efficient Iterative Linear-Quadratic Approximations for Nonlinear Multi-Player General-Sum Differential Games, 2020 IEEE International Conference on Robotics and Automation (ICRA) May 31-Aug. 31, 2020, pp. 1475-1481.

Zhang et al., An Efficient Risk-aware Branch MPC for Automated Driving that is Robust to Uncertain Vehicle Behaviors, Arxiv.Org, Cornell University Library, Mar. 27, 2024.

* cited by examiner

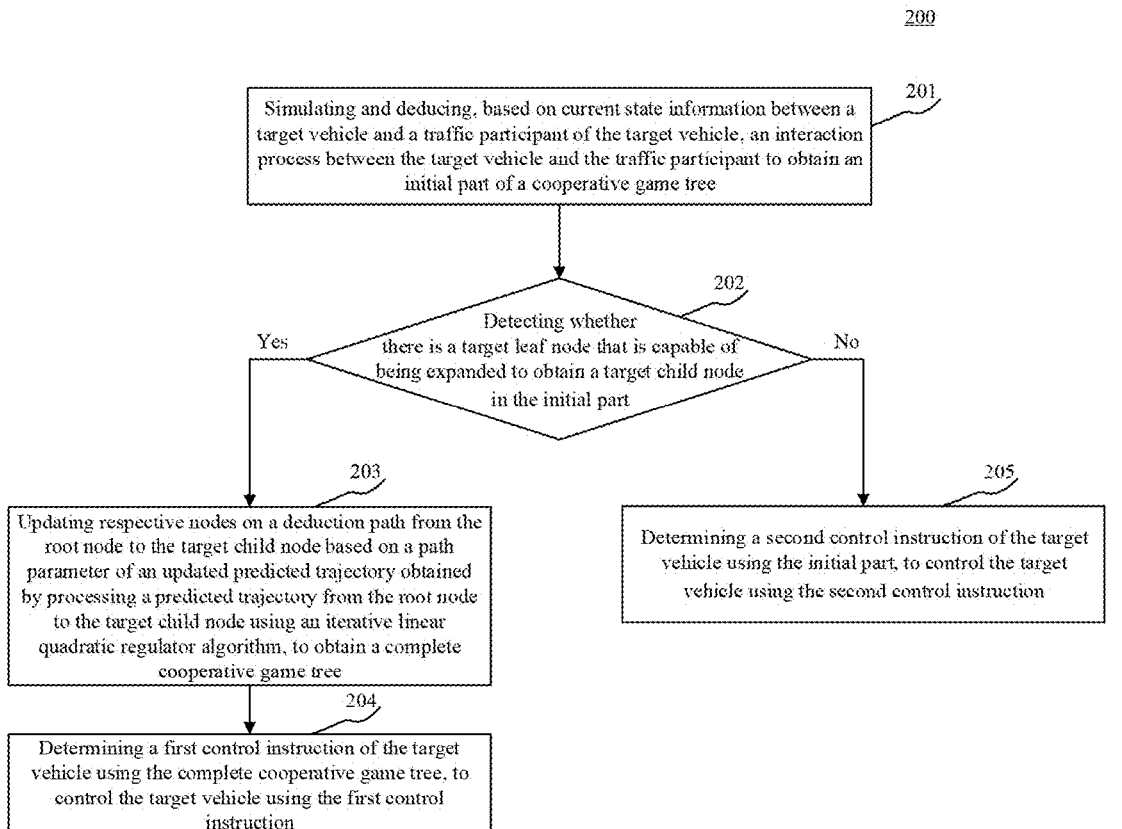

200

201
Simulating and deducing, based on current state information between a target vehicle and a traffic participant of the target vehicle, an interaction process between the target vehicle and the traffic participant to obtain an initial part of a cooperative game tree 202
Detecting whether there is a target leaf node that is capable of being expanded to obtain a target child node in the initial part Yes          No 203
Updating respective nodes on a deduction path from the root node to the target child node based on a path parameter of an updated predicted trajectory obtained by processing a predicted trajectory from the root node to the target child node using an iterative linear quadratic regulator algorithm, to obtain a complete cooperative game tree 205
Determining a second control instruction of the target vehicle using the initial part, to control the target vehicle using the second control instruction 204
Determining a first control instruction of the target vehicle using the complete cooperative game tree, to control the target vehicle using the first control instruction

Fig. 2

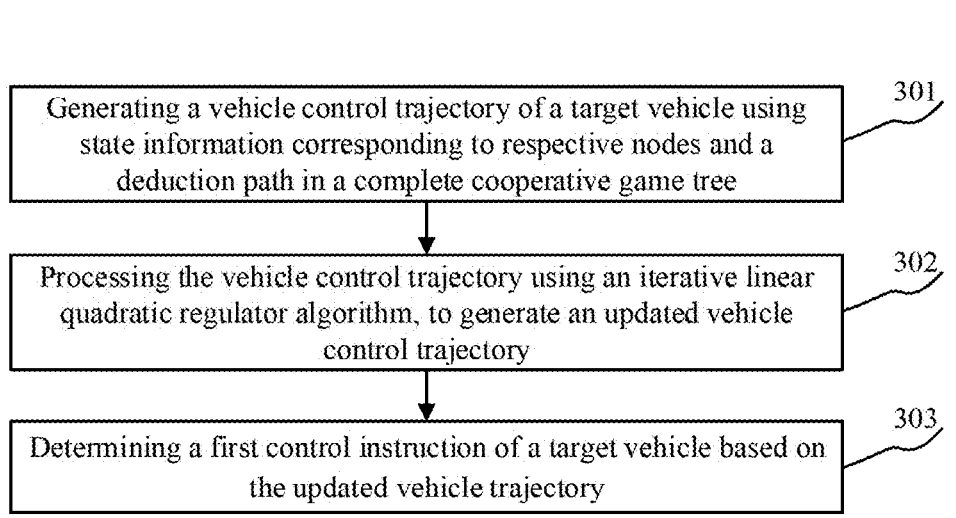

300

Generating a vehicle control trajectory of a target vehicle using state information corresponding to respective nodes and a deduction path in a complete cooperative game tree — 301

Processing the vehicle control trajectory using an iterative linear quadratic regulator algorithm, to generate an updated vehicle control trajectory — 302

Determining a first control instruction of a target vehicle based on the updated vehicle trajectory — 303

Apparatus for controlling a vehicle

Initial game tree deducing unit — 501

Complete game tree generating unit — 502

First control instruction generating unit — 503

600

Computing unit — 601

ROM — 602

RAM — 603

— 604

— 605

I/O interface

Input unit — 606

Output unit — 607

Storage unit — 608

Communication unit — 609

METHOD FOR CONTROLLING VEHICLE, RELATED APPARATUS AND UNMANNED VEHICLE

This patent application claims priority to and the benefits of Chinese Patent Application No. 202410772496.8, filed on Jun. 14, 2024, and entitled "Method for Controlling vehicle, Related Apparatus, Computer Program Product and Unmanned Vehicle", the content of which is herein incorporated by reference in its entirety.

TECHNICAL FIELD

The present disclosure relates to the field of computer technology, specifically to the field of artificial intelligence technology such as data processing, trajectory planning and autonomous driving. The present disclosure may be applied in autonomous driving scenarios, and particularly relates to a method and apparatus for controlling a vehicle, an electronic device, a computer readable storage medium, a computer program product and an unmanned vehicle.

BACKGROUND

With the development of society and technology, unmanned driving and autonomous driving technologies have emerged as the times require. As a combination of multiple cutting-edge disciplines such as sensors, computers, artificial intelligence, communications, navigation and positioning, pattern recognition, machine vision and intelligent control, the autonomous driving technology can independently control a vehicle, or provide assistance information for a driver to assist the driver in driving. Accordingly, it is expected that in this way, the dependence on and consumption of manual labor in vehicle driving can be reduced, and the operational efficiency and driving safety can be improved.

SUMMARY

Embodiments of the present disclosure provide a method and apparatus for controlling a vehicle, an electronic device, a computer readable storage medium, and an unmanned vehicle.

In a first aspect, an embodiment of the present disclosure provides a method for controlling a vehicle, including: simulating and deducing, based on current state information between a target vehicle and a traffic participant of the target vehicle, an interaction process between the target vehicle and the traffic participant to obtain an initial part of a cooperative game tree, where a root node in the initial part corresponds to the current state information; updating, in response to there being a target leaf node that is capable of being expanded to obtain a target child node in the initial part, respective nodes on a deduction path from the root node to the target child node based on a path parameter of an updated predicted trajectory obtained by processing a predicted trajectory from the root node to the target child node using an iterative linear quadratic regulator algorithm, to obtain a complete cooperative game tree, where the complete cooperative game tree is composed of the initial part and the target child node; and determining a first control instruction of the target vehicle using the complete cooperative game tree, to control the target vehicle using the first control instruction.

In a second aspect, an embodiment of the present disclosure provides an apparatus for controlling a vehicle, including: an initial game tree deducing unit, configured to simulate and deduce, based on current state information between a target vehicle and a traffic participant of the target vehicle, an interaction process between the target vehicle and the traffic participant to obtain an initial part of a cooperative game tree, where a root node in the initial part corresponds to the current state information; a complete game tree generating unit, configured to update, in response to there being a target leaf node that is capable of being expanded to obtain a target child node in the initial part, respective nodes on a deduction path from the root node to the target child node based on a path parameter of an updated predicted trajectory obtained by processing a predicted trajectory from the root node to the target child node using an iterative linear quadratic regulator algorithm, to obtain a complete cooperative game tree, where the complete cooperative game tree is composed of the initial part and the target child node; and a first control instruction generating unit, configured to determine a first control instruction of the target vehicle using the complete cooperative game tree, to control the target vehicle using the first control instruction.

In a third aspect, an embodiment of the present disclosure provides an electronic device, the electronic device including: at least one processor; and a memory, connected in communication with the at least one processor. The memory stores an instruction executable by the at least one processor, and the instruction, when executed by the at least one processor, causes the at least one processor to perform the method for controlling a vehicle described by any implementation according to the first aspect.

In a fourth aspect, an embodiment of the present disclosure provides a non-transitory computer readable storage medium, storing a computer instruction, where the computer instruction is used to cause a computer to perform the method for controlling a vehicle described by any implementation according to the first aspect.

In a fifth aspect, an embodiment of the present disclosure provides an unmanned vehicle. The unmanned vehicle includes or is provided with the electronic device according to the third aspect.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

Through detailed descriptions of non-limiting embodiments given with reference to the following accompanying drawings, other features, objectives and advantages of the present disclosure will be more apparent.

FIG. 2 is a flowchart of a method for controlling a vehicle provided by an embodiment of the present disclosure;

FIG. 3 is a flowchart of a process of determining a control instruction provided by an embodiment of the present disclosure;

DETAILED DESCRIPTION OF EMBODIMENTS

Exemplary embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description. It should be noted that the embodiments in the present disclosure and the features in the embodiments may be combined with each other on a non-conflict basis.

In addition, in the technical solution of the present disclosure, the acquisition (e.g., the state information of a vehicle subsequently described in the present disclosure), storage, use, processing, transmission, provision, disclosure, etc. of the personal information of a user all comply with the provisions of the relevant laws and regulations, and do not violate public order and good customs.

Figure 1:
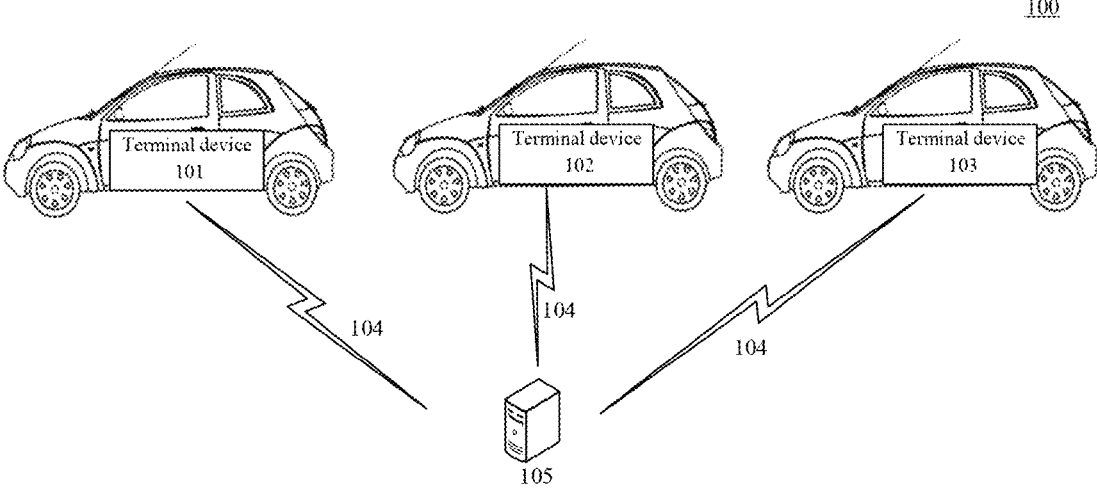
FIG. 1 illustrates an exemplary system architecture in which the present disclosure may be applied.

FIG. 1 illustrates an exemplary system architecture 100 in which an embodiment of a method and apparatus for controlling a vehicle, an electronic device and a computer readable storage medium according to the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, optical fiber cables, or the like.

A user may use the terminal devices 101, 102 and 103 to interact with the server 105 via the network 104, to receive or send messages, etc.

The terminal devices 101, 102 and 103 may be hardware or software. When being the hardware, the terminal devices 101, 102 and 103 may be various electronic devices, the electronic devices including, but not limited to, a vehicle-mounted terminal, a smartphone, a tablet computer, a laptop portable computer, and the like. When being the software, the terminal devices 101, 102 and 103 may be installed in the above electronic devices. The terminal devices may be implemented as a plurality of pieces of software or a plurality of software modules, or may be implemented as a single piece of software or a single software module, which will not be specifically limited here. When being hardware, the server 105 may be implemented as a distributed server cluster composed of a plurality of servers, or may be implemented as a single server. When being software, the server may be implemented as a plurality of pieces of software or a plurality of software modules, or may be implemented as a single piece of software or a single software module, which will not be specifically limited here.

The server 105 can provide various services through various built-in applications. An autonomous driving application that can provide a vehicle control function is taken as an example. When running the autonomous driving application, the server 105 can achieve the following effects. First, the server 105 obtains, through the network 104, the current state information between a target vehicle and a traffic participant (e.g., an other vehicle) in the driving process of the target vehicle from the terminal devices 101 and 102 provided in different vehicles. Then, based on the current state information between the target vehicle and the traffic participant of the target vehicle, the server 105 simulates and deduces the interaction process between the target vehicle and the traffic participant to obtain the initial part of a cooperative game tree. Then, in response to there being a target leaf node that is capable of being expanded to obtain a target child node in the initial part, the server 105 updates each node on the deduction path from the root node to the target child node based on the path parameter of an updated predicted trajectory obtained by processing the predicted trajectory from the root node to the target child node using an iterative linear quadratic regulator algorithm, to obtain a complete cooperative game tree. Here, the complete cooperative game tree is composed of the initial part and the target child node. Finally, the server 105 determines a first control instruction of the target vehicle using the complete cooperative game tree, to control the target vehicle using the first control instruction.

Since the analysis for a vehicle state, the control for a vehicle, etc. may need to occupy many computing resources and needs a strong computing capability, the method for controlling a vehicle provided in the subsequent embodiments of the present disclosure is generally performed by the server 105 having a strong computing capability and many computing resources. Correspondingly, the apparatus for controlling a vehicle is generally provided in the server 105. However, it should also be noted that, when having a computing capability and computing resources that satisfy requirements, the terminal devices 101, 102 and 103 can also complete, through the autonomous driving application installed thereon, the computations originally performed by the server 105, to output the same result as that of the server 105. Particularly, when there are many terminal devices with different computing capabilities at the same time, but the autonomous driving application determines that the terminal device having the application has a strong computing capability and many remaining computing resources, the terminal device may be used to execute the above computations, so as to appropriately reduce the computing pressure on the server 105. Correspondingly, the apparatus for controlling a vehicle may alternatively be provided in the terminal devices 101, 102 and 103. In this situation, the exemplary system architecture 100 may alternatively not include the server 105. For example, the terminal devices 101, 102 and 103 may communicate through the network 104, to control the local vehicle and/or other vehicles either mutually or by a party that is determined and granted the control authority.

It should be appreciated that the numbers of the terminal devices, the networks and the servers in FIG. 1 are merely illustrative. Any number of terminal devices, networks and servers may be provided based on actual requirements.

Referring to FIG. 2, FIG. 2 is a flowchart of a process of controlling a vehicle provided by an embodiment of the present disclosure. Here, the process 200 includes the following steps.

Step 201, simulating and deducing, based on current state information between a target vehicle and a traffic participant of the target vehicle, an interaction process between the target vehicle and the traffic participant to obtain an initial part of a cooperative game tree.

The purpose of this step is that an executing body (e.g., the server 105 shown in FIG. 1) of a method for controlling a vehicle performs the simulating and deducing based on the current state information to determine a possible and potential interaction process between the target vehicle and the traffic participant, after acquiring the current state information between the target vehicle (e.g., a vehicle provided with the terminal device 101 described above) and the traffic participant (e.g., an other vehicle provided with the terminal device 102 described above) of the target vehicle. In some embodiments, the traffic participant may refer to an object such as an other vehicle, a non-motor vehicle, a pedestrian, an obstacle, or the like that may interact with the vehicle and affect the vehicle within a preset distance range of the vehicle. The preset distance range may be specifically set according to actual situations, for example, may be determined according to the sensing distance of an information collection apparatus (e.g., a camera and a radar) provided in the vehicle.

In some embodiments, in order to further improve the quality of planning and detection, and avoid collecting objects which the vehicle will not "interact" with, the executing body may, in the process of determining the traffic participant, choose to select a "target" traffic participant of which the correlation is higher than a preset threshold (e.g., a value determined based on a correlation that is considered to be "of reference value") from traffic participants near the target vehicle according to the traffic correlations between the target vehicle and the traffic participants, to use the "target" traffic participant as the traffic participant that will actually be subjected to the subsequent interaction process deduction.

The current state information generally includes state information such as a relative distance between the target vehicle and a surrounding traffic participant, a distance from a conflict area, a relative speed, and the like. The relative state information, between the target vehicle and the surrounding traffic participant, that is obtained based on the state information of the target vehicle and the state information of the surrounding traffic participant collected by the information collection apparatus in real time may be considered as the current state information between the target vehicle and the surrounding traffic participant.

It should be appreciated that, in actual scenarios, the above traffic participant may be one or more than one.

The executing body may simulate and deduce the interaction process between the target vehicle and the traffic participant based on the current state information to obtain the initial part of the cooperative game tree. The above executing body may use the current state information as a root node, generate an action decision of the target vehicle and an action decision of the traffic participant according to the current state information, and then determine updated state information after the target vehicle and the traffic participant respectively perform the corresponding action decision, to obtain a child node of the root node. For example, the child node of the root node may refer to the state information at a moment having a preset time step size after the "current moment" corresponding to the root node. Accordingly, a child node of the child node of the root node may refer to the state information at the moment having two preset time step sizes after the "current moment." Thus, the executing body may continue the interaction between the target vehicle and the traffic participant based on the updated state information, and finally obtain the initial part of the cooperative game tree.

For example, the executing body may determine the action decision of the target vehicle for the operation information under the current state information by using the current state information as the root node, and then determine the action decision of the traffic participant for the operation information based on the current state information and the action decision made by the target vehicle. Then, according to the action decision of the target vehicle and the action decision of the traffic participant, the updated state information (the child node of the root node) is determined on the basis of the state information represented by the root node. Then, the interaction between the target vehicle and the traffic participant is continued based on the updated state information until preset end state information is reached. Accordingly, the executing body may build the initial part of the cooperative game tree based on the result of the deduction (i.e., a group of interaction processes). In this initial part, the "current state information" may be used as the root node, and the subsequent possible interaction state between the target vehicle and the traffic participant may be used as a subsequent child node or leaf node.

The preset end state information may refer to, for example, a state reached when a prediction time upper limit is reached. For example, when it is expected to construct the initial part of the cooperative game tree based on the time length of 30 seconds in the future, the preset end state information may refer to the interactive state at the 30th second in the future compared with the current moment. Accordingly, the prediction time length may be the length of a preset number of preset time step sizes, and thus, the prediction time length can match the preset time step size, such that the executing body can "completely" divide the prediction time length in units of "preset time step sizes." For example, in the situation of a time length of 30 seconds, when the preset time step size is 5 seconds, the time length may be completely divided into 6 segments. The preset end state information may alternatively refer to a collision between the target vehicle and the traffic participant, or both of them safely driving through the conflict area. Accordingly, in the initial part of the cooperative game tree, the leaf node may alternatively be the interactive state corresponding to the "preset end state information."

In general, the executing body may traverse all interaction situations between the target vehicle and the traffic participant to obtain the initial part of the cooperative game tree. The initial part of the cooperative game tree may represent a game tree constructed with the principle that a non-zero sum game is played between the target vehicle and the traffic participant to ensure the overall driving safety and road traffic efficiency.

In the process discussed above, the "initial part" is described. However, such an "initial part" explicitly has a tree structure in the actual process, and is only described in terms of the number of nodes and the parameters corresponding to the nodes, and thus may not be as good as the number of nodes and quality of use of the "complete cooperative game tree" described later. However, it should be understood that since such an "initial part" also has a tree structure, in some scenarios, the "initial part" may actually be used for decision-making.

In a situation where there are a plurality of traffic participants, the above executing body may predetermine the priorities of the plurality of traffic participants in each situation in advance, and then determine the action decisions of the target vehicle and the plurality of traffic participants in sequence according to the determined priorities. A priority may be determined according to the distance from the target vehicle, and the priority is negatively related to the distance. The priority may alternatively be determined based on road information (e.g., road level information such as a main road and a secondary road), driving information (e.g., going straight, and turning), and the like. In the embodiments of the present disclosure, for ease of understanding, only a single traffic participant is exemplified.

Step 202, detecting whether there is a target leaf node that is capable of being expanded to obtain a target child node in the initial part.

On the basis of the above step 201, the purpose of this step is that the executing body performs a detection on each leaf node in the initial part determined in step 201 and determines whether each leaf node may continue an expansion, for example, whether each leaf node may continue the expansion to obtain an other "child node" or "leaf node."

If a leaf node can continue the expansion to obtain at least one "child node" or "leaf node," for ease of understanding, such a leaf node may be described as a "target leaf node." Accordingly, if the executing body detects that there is the target leaf node that is capable of being expanded to obtain the target child node in the initial part, the executing body may choose to perform step 203 in response thereto.

It should be understood that the target child node obtained through the expansion should also generally satisfy the "requirements" for the construction of the cooperative game tree. For example, the state corresponding to the target child node should generally be within the "time length" taken to build the cooperative game tree.

Step 203, updating each node on a deduction path from the root node to the target child node based on a path parameter of an updated predicted trajectory obtained by processing a predicted trajectory from the root node to the target child node using an iterative linear quadratic regulator algorithm, to obtain a complete cooperative game tree.

On the basis of the above step 202, this step is intended to be performed by the executing body when it is determined that there is the target leaf node. When determining that there is the target leaf node, the executing body first determines, based on the initial part, the deduction path from the root node of the initial part to the determined target child node (that is, a combination result of the path from the root node to the target leaf node that can be expanded to obtain the target child node and the path from the target leaf node to the target child node in the initial part, that is, the start point of the deduction path is the root node of the initial part, and the end point of the deduction path is the target child node), to determine the predicted trajectory corresponding to the deduction path (that is, a vehicle trajectory formed by continuously reaching the states indicated in the above path).

Then, the executing body processes the predicted trajectory using the iterative linear quadratic regulator algorithm, to generate the updated predicted trajectory corresponding thereto. In the iterative linear quadratic regulator (referred to as ILQR) algorithm, "iterative" is similar to the iteration in the Newton method. In an unconstrained optimization method, the gradient descent method uses a first-order term to approximate an original function to iteratively solve a next value, and the Newton method uses a second-order term to approximate the original function to iteratively solve the next value. In this way, after the local linearization is implemented through a Taylor expansion, the "overall" optimization is achieved based on the result of each local optimization.

In some embodiments, the executing body may split the predicted trajectory into "a plurality of to-be-updated positions," and perform updating on the predicted trajectory. As an example, the executing body first builds a kinematic equation of the target vehicle (e.g., a kinematic equation built based on operation information such as a speed and an acceleration of the vehicle). For example, the equation may be exemplified as f(x,u), where x is a state quantity (information) of the target vehicle, and u is a control quantity (information) of the target vehicle. In some embodiments, in order to improve the control quantity, the update process may be constrained by setting a cost equation L(x,u) based on a perceived cost, an obstacle, and a road boundary constraint, etc. in the update process.

For example, the executing body may respectively calculate $$f_x^i, f_u^i, L_x^i, L_u^i, L_{xx}^i, L_{ux}^i \text{ and } L_{uu}^i,$$

where $$f_x^i$$

is the first-order partial derivative of the kinematic equation of the vehicle at an i-th to-be-updated position with respect to the state quantity $$x; f_u^i$$

is the first-order partial derivative of the kinematic equation of the vehicle at the i-th to-be-updated position with respect to the control quantity $$u; L_x^i$$

the first-order partial derivative of the cost equation of the vehicle at the i-th to-be-updated position with respect to the state quantity $$x; L_u^i$$

is the first-order partial derivative of the cost equation of the vehicle at the i-th to-be-updated position with respect to the control quantity $$u; L_{xx}^i$$

is the second-order partial derivative of the cost equation of the vehicle at the i-th to-be-updated position with respect to the state quantity $$x; L_{ux}^i$$

is the second-order partial derivative of the cost equation of the vehicle at the i-th to-be-updated position with respect to the state quantities $u$ and $x$; and $L_{uu}^i$ is the second-order partial derivative of the cost equation of the vehicle at the i-th to-be-updated position with respect to the state quantity u.

Then, the executing body sequentially performs a back propagation operation and a forward propagation operation based on the operation results of the $$f_x^i, f_u^i, L_x^i, L_u^i, L_{xx}^i \text{ and } L_{ux}^i,$$

to determine a Taylor expansion based cost J(x,u).

Finally, the executing body selects a state sequence X (composed of a plurality of x) and control sequence U (composed of a plurality of u) of the target state corresponding to a minimum J(x,u) as the optimization result, that is, the updated predicted trajectory described above.

Then, the executing body may update each node on the deduction path from the root node to the target child node based on these path parameters to obtain the complete cooperative game tree. The complete cooperative game tree is composed of the initial part and the above target child node obtained through the expansion. In some scenarios, this process may also be referred to as a "backtracking" process of the cooperative game tree, in which the simulated selection result may be used to update the nodes involved in the cooperative game tree to feed back the result of the "simulated interaction," thereby providing guidance for subsequent selections.

It should be understood that, after updating each node to obtain the complete cooperative game tree based on this step, the executing body may further choose to re-perform the above process of obtaining the cooperative game tree and the process of finding the "target leaf node," thereby further improving the quality of the complete cooperative game tree through many rounds of iterations and updates. For example, in some embodiments, the executing body may cyclically (e.g., may be instructed to cyclically perform the processes for a pre-configured number of rounds of iterations) perform the processes of steps 201-203, to perform training many times in an iterative manner to obtain the "complete cooperative game tree" that is finally used. In other words, the processes described and discussed above may be understood as the implementation process in "one round" in the cycle. Accordingly, the executing body may cyclically and iteratively update and optimize the "complete cooperative game tree" based on the implementation result of the previous round, to improve the quality of use of the cooperative game tree.

Step 204, determining a first control instruction of the target vehicle using the complete cooperative game tree, to control the target vehicle using the first control instruction.

The purpose of this step is that the above executing body generates the first control instruction for controlling the action of the target vehicle after obtaining the complete cooperative game tree based on the above step 203.

In some alternative implementations of this embodiment, the executing body may choose to generate a vehicle control trajectory of the target vehicle using the state information and deduction path corresponding to each node in the complete cooperative game tree. Then, a control instruction for controlling the target vehicle to achieve the vehicle control trajectory is determined based on the vehicle control trajectory.

For example, the executing body may determine the state information corresponding to all leaf nodes in the (complete) cooperative game tree, determine, from the child nodes of the root node, a child node including the most leaf nodes representing the safe passage of the target vehicle and the traffic participant through the conflict area according to the deduction path in the cooperative game tree, and then determine the action decision of the target vehicle that corresponds to the child node as a decision instruction. Generally, the action decision of the target vehicle that corresponds to the child node represents that, on the basis of the state information corresponding to the root node, the updated state information corresponding to the target child node is obtained based on the action decision. Thus, the executing body may deduce the "appropriate and expected vehicle control trajectory" through the cooperative game tree. Then, the vehicle may be controlled by implementing the vehicle control trajectory, such that the vehicle may be "continuously" controlled with quality based on the selection and use result of the cooperative decision tree.

According to the method for controlling a vehicle provided in the embodiment of the present disclosure, the interaction process between the target vehicle and the traffic participant is simulated and deduced based on the current state information between the target vehicle and the traffic participant of the target vehicle, to obtain the initial part of the cooperative game tree, where the root node in the initial part corresponds to the current state information. Then, in the situation where there is the target leaf node that is capable of being expanded to obtain the target child node in the initial part, each node on the deduction path from the root node to the target child node is updated based on the path parameter of the updated predicted trajectory obtained by processing the predicted trajectory from the root node to the target child node using the iterative linear quadratic regulator algorithm, to obtain the complete cooperative game tree composed of the initial part and the target child node. Finally, the first control instruction of the target vehicle is determined using the complete cooperative game tree, to control the target vehicle using the first control instruction. Accordingly, not only can the decision-making efficiency in the vehicle control process be improved, but also the trajectory planning can be performed more smoothly and with higher quality, thereby improving the control quality of the vehicle.

In some alternative implementations of this embodiment, the executing body may not be able to obtain a child node based on the expansion of the leaf node in the initial part. That is, in the embodiment shown in FIG. 2, the executing body may perform step 202, finding that there is no "target leaf node that is capable of being expanded to obtain a target child node."

In such a situation, the process 200 may further include the following step 205. Step 205 may be performed in the situation where the executing body determines that there is no target leaf node that is capable of being expanded to obtain the target child node in the initial part after performing step 202.

Step 205, determining a second control instruction of the target vehicle using the initial part, to control the target vehicle using the second control instruction.

Specifically, the executing body may choose to determine the second control instruction of the target vehicle using the initial part, to control the target vehicle using the second control instruction. That is, in such a case, the executing body may directly make a decision using the "initial part" determined in step 201. Accordingly, the vehicle is prevented from being "out of control," thereby improving the safety of the vehicle.

In some embodiments, as discussed above, in the situation where there is no target leaf node, the executing body may alternatively choose to perform an emulation based on the simulation and deduction result of the leaf node in the initial part (i.e., the path in the simulation and deduction result that is indicated by the initial part), to perform the "backtracking" using the leaf node in the initial part. Correspondingly, such a "backtracking" process may also be implemented "cyclically" or "through many rounds," and thus will not be repeatedly described here.

It should be understood that in the "cyclic" process, the executing body may combine the above two "backtracking" approaches. For example, in the situation where there is the target leaf node, the backtracking is implemented based on the target child node, and in some rounds where the "target leaf node" is absent, the "backtracking" is performed based on the "leaf node in the initial part." In this way, it is ensured that the "cycle" can be implemented continuously according to a preset number of rounds, thereby improving the quality of the cooperative game tree.

In some alternative implementations of this embodiment, the executing body may alternatively determine that there are at least two target child nodes obtained through the expansion. For example, one target leaf node is expanded to obtain two or more target child nodes, or there are a plurality of target leaf nodes that can be expanded to obtain at least one target child node. In this situation, the executing body can improve the execution efficiency by (calling in parallel and simultaneously) at least two graphics processing units (referred to as GPU), or threads.

For example, for step 203 in the above embodiment shown in FIG. 2, as a candidate or addition, if there are at least two target child nodes obtained through the expansion. The executing body may allocate respective independent first processing threads to the target child nodes, for example, allocate a corresponding processing thread a to a target child node A, and a corresponding processing thread b to a target child node B.

Then, the executing body may choose to process, in parallel, predicted trajectories from the root node to the target child nodes in the respective first processing threads using the iterative linear quadratic regulator algorithm, to generate respective updated predicted trajectories corresponding to the target child nodes. For example, the executing body may use the processing threads a and b simultaneously and in parallel to respectively process the target child nodes A and B. That is, in the processing thread a, the executing body may independently update each node on the deduction path from the root node to the target child node based on the path parameter of the updated predicted trajectory obtained by processing the predicted trajectory from the root node to the target child node A using the iterative linear quadratic regulator algorithm. At the same time, in the processing thread b, the executing body may independently update each node on the deduction path from the root node to the target child node based on the path parameter of the updated predicted trajectory obtained by processing the predicted trajectory from the root node to the target child node B using the iterative linear quadratic regulator algorithm, in parallel with the processing thread a. Therefore, the parallel threads not only can improve the processing capability of the cooperative game tree to enable the executing body to build and generate a cooperative game tree in a more complex situation, but also can complete the update for the predicted trajectory and the update for each node on the deduction path more efficiently.

In some embodiments, due to the large number of interaction situations between the target vehicle and the traffic participant, when the computing capability of the above executing body is not strong, the above executing body may not be able to obtain the cooperative game tree through the traversal. In order to improve the processing efficiency and reduce the processing burden of the executing body, the executing body may alternatively choose to build the "cooperative game tree" based on the form of a Monte-Carlo tree search (referred to as MCTS), or in short, in the form or using the structure of a "Monte-Carlo tree." The Monte-Carlo tree (search) may be understood as an approximate inference method, which solves an expectation by sampling a large number of samples to reflect the overall interaction situation between the vehicle and the traffic participant.

For example, when implementing step 201 in the above embodiment shown in FIG. 2, the executing body may alternatively choose to build the "initial part of the cooperative game tree" in the form of the "Monte-Carlo tree." For example, based on the current state information between the target vehicle and the traffic participant of the target vehicle, the executing body may adopt an upper confidence bound apply to tree algorithm, to perform Monte-Carlo sampling on operation information of the target vehicle and operation information of the traffic participant using an upper value of a confidence interval, to simulate and deduce the interaction process between the target vehicle and the traffic participant to find each leaf node of the cooperative game tree.

Specifically, for each Monte-Carlo sampling operation, the executing body may determine the child node having a maximum upper bound value of the confidence interval among the child nodes of a current node to perform a subsequent sampling process until the deduction ends. For each node, the above executing body may determine the upper bound value of the confidence interval based on the following formula (1):

$$\text{upper bound value of confidence interval} = v_i + C * \sqrt{\frac{\ln N}{n_i}}. \tag{1}$$

Here, $v_i$ is an estimated value of a current to-be-decided node, C is a pre-configured constant, N is the number of visits to a parent node of the current to-be-decided node, and $n_i$ is the number of visits to the current to-be-decided node.

Correspondingly, the executing body selects the initial part of the cooperative game tree in this way, that is, obtains the initial part of the cooperative game tree based on the root node and each leaf node.

In some embodiments, the Monte-Carlo tree may be built through four steps: selection, expansion, simulation, and back propagation. If the cooperative game tree is built in the form of the Monte-Carlo tree, the executing body may use the above-discussed approach as a substitute for at least some steps in the process of building the Monte-Carlo tree. For example, the above-discussed approach may be used as a substitute for the "simulation" and "back propagation" processes to implement the determination for the "complete" cooperative game tree provided by the present disclosure under the framework and implementation scenario of the "Monte-Carlo tree." For example, the executing body may use the above step 203 to simultaneously replace the "simulation" and "back propagation" processes to "combine" the approaches provided by the present disclosure into the Monte-Carlo tree structure to achieve an "improved Monte-Carlo tree structure."

In some embodiments, in the process of building the initial part based on the form of the Monte-Carlo tree, the executing body may alternatively choose to improve the efficiency in simulating and deducing the interaction process between the target vehicle and the traffic participant to find each leaf node of the cooperative game tree, by configuring a plurality of threads and through parallel threads.

Specifically, the executing body may select the current state information between the target vehicle and the traffic participant of the target vehicle as the root node of the cooperative game tree. Then, in at least two (or more) independent processing threads (which are described as second processing threads for ease of understanding), the executing body may perform in parallel, starting from the root node, the Monte-Carlo sampling on the operation information of the target vehicle and the operation information of the traffic participant, to simulate and deduce the interaction process between the target vehicle and the traffic participant to obtain and find leaf nodes. Accordingly, the executing body may collect and combine the leaf nodes corresponding to the respective second processing threads to obtain leaf nodes of (the initial part of) the cooperative game tree. In other words, the combination result of the leaf nodes corresponding to the respective second processing threads refers to the leaf nodes of the cooperative game tree.

For example, for processing threads c and d, the processing threads c and d may be instructed and configured by the executing body, to perform, simultaneously and in parallel, the process of "perform, starting from the root node, the Monte-Carlo sampling on the operation information of the target vehicle and the operation information of the traffic participant, to simulate and deduce the interaction process between the target vehicle and the traffic participant to obtain and find leaf nodes". Then, the executing body may combine the leaf nodes respectively found by the processing threads c and d (e.g., take the intersection therebetween) to obtain the leaf nodes of (the initial part of) the cooperative game tree. Thus, by means of the multi-thread parallel processing, the efficiency in building and searching the cooperative game tree can be improved, such that the cooperative game tree can be built more efficiently.

In some alternative implementations of this embodiment, in the process of using the at least two second processing threads to perform processing in parallel, in order to enable different processing threads to be evenly allocated to nodes and to visit a predicted trajectory with a deeper depth as many as possible (such that the predicted trajectory selected later may be processed and updated more fully by the ILQR algorithm to improve the trajectory quality), the executing body may use an updated upper bound value of the confidence interval to implement the upper confidence bound apply to tree algorithm. The updated upper bound value of the confidence interval may be determined based on a total number of second threads (i.e., the number of second threads visiting the parent node) associated with the parent node of the current to-be-decided node, a total number of second threads (i.e., the number of second threads visiting the current to-be-decided node) associated with the current to-be-decided node, and a depth corresponding to the parent node of the current to-be-decided node. For example, the updated upper bound value of the confidence interval may be determined based on the following formula (2):

$$\text{updated upper bound value of confidence interval} = \quad (2)$$

$$v_i + C * \sqrt{\frac{\ln(N + T + D)}{n_i + t_i}}.$$

Here, $v_i$ is an estimated value of the current to-be-decided node, C is a pre-configured constant, N is the number of visits to the parent node of the current to-be-decided node, D is a depth corresponding to the parent node of the current to-be-decided node, $n_i$ is the number of visits to the current to-be-decided node, T is the total number of second threads associated with the parent node including the current to-be-decided node i, and $t_i$ is the total number of second threads associated with the current to-be-decided node.

In some alternative implementations of this embodiment, the updated upper bound value of the confidence interval may alternatively not include "D" indicating the depth corresponding to the parent node of the current to-be-decided node, to separately "enable different processing threads to be evenly allocated to nodes."

In some embodiments, when finding the "child node" of the leaf node, that is, confirming whether the child node can be obtained based on the "expansion" of a current leaf node, the executing body may alternatively improve the execution efficiency through parallel threads. Specifically, the executing body allocates respective independent processing threads (which is described as a third processing thread for ease of understanding) to leaf nodes in the initial part. Then, the executing body finds in parallel child nodes of corresponding leaf nodes using the respective third processing threads. For example, for leaf nodes E and F, the executing body may respectively allocate a processing thread e to the leaf node E and a processing thread f to the leaf node F. Then, the executing body uses the processing threads e and f in parallel, to simultaneously detects whether the leaf nodes E and F can be expanded to obtain "child nodes."

In some embodiments, in order to improve the efficiency in building and using the "complete cooperative game tree," it is possible to choose to use only the "complete cooperative game tree" to decide a "roughing path" to determine a "control direction." Then, based on a "refinement algorithm," the "roughing path" is "refined" to achieve the final and actual control. In this way, the difficulty of building a "complete cooperative game tree" is reduced and the control quality is improved.

In this regard, reference is made to FIG. 3. FIG. 3 is a flowchart of a process of determining a control instruction provided by an embodiment of the present disclosure, including a process 300. The process 300 may be used as a candidate or alternative for step 204 in the above embodiment shown in FIG. 2. Specifically, the process 300 may include the following steps.

Step 301, generating a vehicle control trajectory of a target vehicle using state information corresponding to each node and a deduction path in a complete cooperative game tree.

Specifically, the executing body may still generate the vehicle control trajectory using the complete cooperative game tree, as discussed in the above step 204.

Step 302, processing the vehicle control trajectory using an iterative linear quadratic regulator algorithm, to generate an updated vehicle control trajectory.

Specifically, the executing body may use the vehicle control trajectory generated in step 301 as a "roughing path," and then optimize the vehicle control trajectory using the ILQR algorithm as discussed above. For example, the executing body may split the vehicle control trajectory based on the ILQR algorithm, to determine a plurality of "update positions" from the vehicle control trajectory. Then, the executing body may process and optimize the "update positions" through the ILQR algorithm, to obtain the position update results corresponding to the update positions. Next, the executing body may obtain an overall updated vehicle control trajectory optimization by combining the position update results, so as to realize the "refinement" for the "roughing path."

Step 303, determining a first control instruction of the target vehicle based on the updated vehicle control trajectory.

Specifically, after obtaining the "refined" and updated vehicle control trajectory based on the above step 302, the executing body may similarly process the updated vehicle control trajectory as a "control instruction" based on the approach discussed above. Accordingly, the executing body may use the "control instruction" obtained by processing the updated vehicle control trajectory as the first control instruction described above, for controlling the target vehicle to achieve the updated vehicle control trajectory.

Therefore, by combining the "using the complete cooperative game tree" and the independent ILQR algorithm, the vehicle control is realized through a two-level approach of "rough planning" and "fine planning." In the situation where the quality of the vehicle control is ensured, the use standard of the "using the complete cooperative game tree" can be lowered, such that the "complete cooperative game tree" can be built more quickly.

In some alternative implementations of this embodiment, for the process of processing the vehicle control trajectory using the ILQR algorithm to generate the updated vehicle control trajectory, as discussed above, the process is actually implemented by independently deducing and updating the plurality of update positions. Accordingly, in the process of generating the updated vehicle control trajectory based on the ILQR algorithm, the executing body may alternatively choose to implement, for a group of update positions used for being updated using the ILQR algorithm and determined from the vehicle control trajectory, the "updating" on the update positions by using parallel processing threads.

Specifically, the executing body may choose to allocate respective independent processing threads (which may be described as a fourth processing thread for ease of description) to the update positions. Then, the executing body may choose to process, in parallel, the respective update positions by using the ILQR algorithm in the respective fourth processing threads, to obtain respective position update results. Finally, the executing body may generate the updated vehicle control trajectory based on the position update results obtained through the processing in respective fourth threads (for example, by combining the position update results). Thus, the efficiency in updating the vehicle control trajectory is improved.

Accordingly, in some embodiments, if there are sufficient processing threads, the executing body may alternatively choose to determine the $$f_x^i, f_u^i, L_x^i, L_u^i, L_{xx}^i \text{ and } L_{ux}^i$$

in parallel by using parallel threads, to improve the efficiency.

In some embodiments, in the process of parallel processing threads, the executing body may preferentially acquire the "total number" of processing threads that can be used currently, and perform an allocation based on the "total number" of the processing threads. For example, in the allocation scenario of the above first processing thread, if the executing body determines that the "total number" can satisfy the allocation of one first processing thread to each target child node, the executing body may choose to allocate one first processing thread to each target child node at the same time. Correspondingly, if the "total number" does not satisfy the allocation, the executing body may choose to allocate a first processing thread to the target child nodes in sequence according to the order in which the target child nodes are determined. Moreover, after fully allocating the currently available first processing threads, the executing body may control a target child node to which no processing thread is allocated to wait or temporarily suspend, and allocate, when there is a new idle processing thread, the processing thread to the target child node. In this way, the stability of the system is improved, and at the same time, the target child nodes can be "processed" more preferentially when the condition is satisfied, thereby improving the processing efficiency.

On the basis of any one of the above embodiments, after the predicted trajectory from the root node to the target child node is processed using the ILQR algorithm to generate the updated predicted trajectory, the corresponding original expansion result and predicted trajectory of this "target child node" after being processed by using the ILQR algorithm (the updated predicted trajectory obtained) may be not expected to be used for "backtracking", for example, after being processed by using the ILQR algorithm, the trajectory falls into a local optimum, and is actually no longer "available" for the global situation. For example, this target child node may cause the vehicle to have an unexpected interaction (e.g., an acceleration collision). Therefore, after processing the predicted trajectory from the root node to the target child node by using the ILQR algorithm, the executing body may first determine and detect whether the predicted trajectory is actually "expected." Specifically, the executing body may generate a use evaluation score for the updated predicted trajectory based on a pre-configured scoring strategy. For example, the executing body may set a scoring strategy based on the dimensions such as the smoothness and physical comfort of the updated predicted trajectory, such that the executing body can generate the use evaluation score for the updated predicted trajectory.

Then, the executing body compares the use evaluation score with a preset score threshold (for example, the score threshold may be set based on an "expected" criterion). If the use evaluation score for the updated predicted trajectory is greater than or equal to the preset score threshold, the executing body may determine that the updated predicted trajectory is "expected." Then, the executing body may update, based on the discussion in step 203 in the above embodiment shown in FIG. 2, each node on the deduction path from the root node to the target child node based on the path parameter of the updated predicted trajectory, thus implementing the "backtracking" to obtain the complete cooperative game tree.

In some alternative implementations of this embodiment, if the executing body determines that the use evaluation score of the updated predicted trajectory is less than the preset score threshold, the executing body may determine that the deduction path between the root node and the target child node is not expected after the processing by the ILQR algorithm. Accordingly, the executing body may choose to update each node on the deduction path from the root node to the target child node directly based on the path parameter of the predicted trajectory to implement the "backtracking" to obtain the complete cooperative game tree. Therefore, the "negative impact" caused by the improper introduction of the ILQR algorithm can be avoided, thereby improving the overall vehicle control quality of the system.

Figure 4:
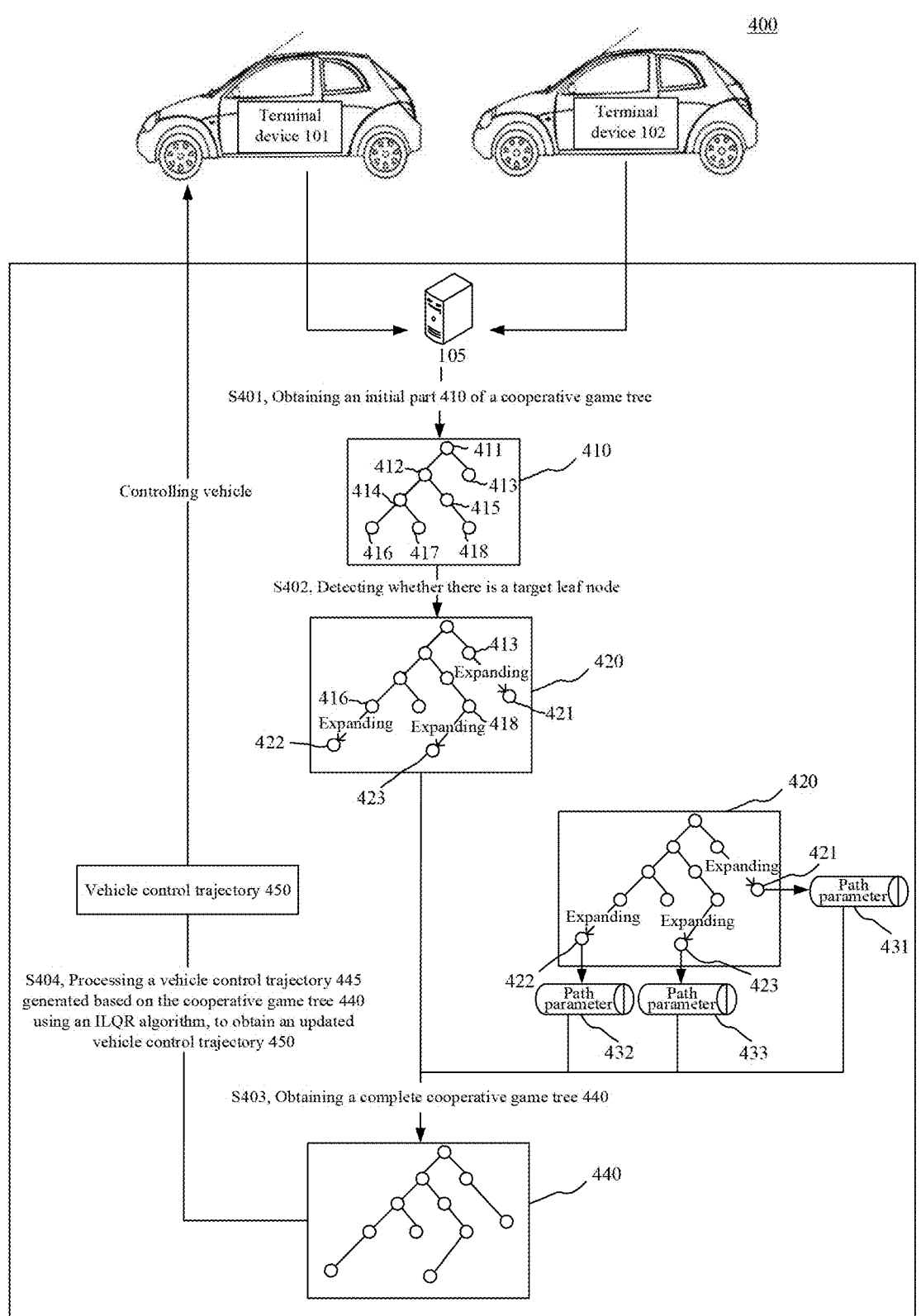
FIG. 4 is a schematic flow diagram of a method for controlling a vehicle in an application scenario provided by an embodiment of the present disclosure.

For deepening the understanding, the present disclosure further provides a specific implementation (see process 400 shown in FIG. 4) in combination with a specific application scenario. For ease of understanding, the description is performed in combination with the exemplary system architecture shown in FIG. 1.

For example, in process 400, the server 105 may be used as an executing body controlling a vehicle, to control at least a "target vehicle" (hereinafter directly described as "terminal device 101" for the convenience of understanding) provided with the terminal device 101. As an example, in this scenario, an "other vehicle" (hereinafter directly described as "terminal device 102" for the convenience of understanding) provided with the terminal device 102 may be used as the traffic participant of the "target vehicle." For example, the server 105 may communicate with the terminal devices 101 and 102 to acquire the current state information between the target vehicle and the traffic participant of the target vehicle.

The server 105 may perform S401 to simulate and deduce, based on the current state information between the target vehicle and the traffic participant of the target vehicle, an interaction process between the target vehicle and the traffic participant to obtain an initial part 410 of a cooperative game tree.

In the initial part 410 of the cooperative game tree, a node 411 may be used as a "root node" (a node corresponding to the current state information between the target vehicle and the traffic participant of the target vehicle). Correspondingly, the server 105 obtains the initial part 410 of the cooperative game tree based on the simulated and deduced interaction process between the target vehicle and the traffic participant. For ease of understanding, the initial part 410 of the cooperative game tree may be built in the form of a Monte-Carlo tree.

In the above simulation and deduction process, the server 105 may perform, independently or in parallel, the deduction process from the node 411 to a leaf node 416 via nodes 412 and 414 based on a first processing thread. At the same time, the server 105 may perform, independently or in parallel, the deduction process from the node 411 to a leaf node 418 via nodes 412 and 415 based on a second processing thread. At the same time, the server 105 may perform, independently or in parallel, the deduction process from the node 411 to a leaf node 413 based on a third processing thread.

Then, the server 105 may further perform S402 to determine and detect whether each of the existing leaf nodes in the initial part 410 of the cooperative game tree can continue to be "expanded," that is, whether there is a "target leaf node" that is capable of being expanded to obtain a target child node. For example, respective processing threads may be independently allocated to the leaf nodes 416, 418 and 413 to find, in parallel, whether the leaf nodes 416, 418 and 413 can continue to be "expanded," to determine whether the leaf nodes 416, 418 and 413 are "target leaf nodes."

As an example, the leaf nodes 416, 418 and 413 can all be expanded. For example, the leaf node 416 can at least be expanded to obtain a node 422, the leaf node 418 can at least be expanded to obtain a node 423, and the leaf node 413 can at least be expanded to obtain a node 421.

Further, for these "target leaf nodes" that can be expanded to obtain the nodes, the server 105 may perform S403 to update respective nodes on a deduction path from the root node to the target child nodes based on a path parameter of an updated predicted trajectory (e.g., a path parameter 432 corresponding to the node 422, a path parameter 433 corresponding to the node 423 and a path parameter 431 corresponding to the node 421) obtained by processing a predicted trajectory from the root node to the target child nodes using an ILQR algorithm, to obtain a complete cooperative game tree 440.

Next, the server 105 may perform S404, to process a vehicle control trajectory 445 generated based on the cooperative game tree 440 using the ILQR algorithm, to obtain an updated vehicle control trajectory 450.

Finally, the server 105 may choose to use the updated vehicle control trajectory 450 to actually control the "target vehicle."

The method for controlling a vehicle according to embodiment of the present disclosure can not only improve the decision-making efficiency in the vehicle control process, but also perform the trajectory planning more smoothly and with higher quality, thereby improving the control quality of the vehicle.

Figure 5:
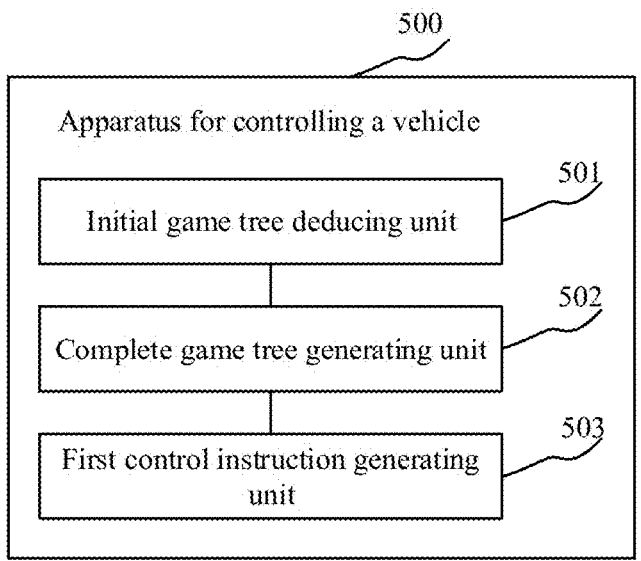
FIG. 5 is a structural block diagram of an apparatus for controlling a vehicle provided by an embodiment of the present disclosure.

Further referring to FIG. 5, as an implementation of the method shown in the above drawings, the present disclosure provides an embodiment of an apparatus for controlling a vehicle. The embodiment of the apparatus corresponds to the embodiment of the method shown in FIG. 2, and the apparatus may be applied in various electronic devices.

As shown in FIG. 5, an apparatus 500 for controlling a vehicle in this embodiment may include: an initial game tree deducing unit 501, a complete game tree generating unit 502 and a first control instruction generating unit 503. The initial game tree deducing unit 501 is configured to simulate and deduce, based on current state information between a target vehicle and a traffic participant of the target vehicle, an interaction process between the target vehicle and the traffic participant to obtain an initial part of a cooperative game tree. Here, a root node in the initial part corresponds to the current state information. The complete game tree generating unit 502 is configured to update, in response to there being a target leaf node that is capable of being expanded to obtain a target child node in the initial part, respective nodes on a deduction path from the root node to the target child node based on a path parameter of an updated predicted trajectory obtained by processing a predicted trajectory from the root node to the target child node using an iterative linear quadratic regulator algorithm, to obtain a complete cooperative game tree. Here, the complete cooperative game tree is composed of the initial part and the target child node. The first control instruction generating unit 503 is configured to determine a first control instruction of the target vehicle using the complete cooperative game tree, to control the target vehicle using the first control instruction.

In this embodiment, for specific processes of the initial game tree deducing unit 501, the complete game tree generating unit 502 and the first control instruction generating unit 503 in the apparatus 500 for controlling a vehicle, and their technical effects, reference may be respectively made to the related description of steps 201-204 in the corresponding embodiment of FIG. 2, and thus the specific processes and the technical effects thereof will not be repeatedly described here.

In some alternative implementations of this embodiment, there are at least two target child nodes obtained through the expansion. The complete game tree generating unit 502 includes: a first thread allocating subunit, configured to allocate respective independent first processing threads to the target child nodes, in response to there being the target leaf node that is capable of being expanded to obtain the target child node in the initial part; and a complete game tree generating subunit, configured to process, in parallel, respective predicted trajectories from the root node to the target child nodes in respective first processing threads using the iterative linear quadratic regulator algorithm, to generate respective updated predicted trajectories corresponding to the target child nodes.

In some alternative implementations of this embodiment, the initial game tree deducing unit 501 includes: a leaf node finding subunit, configured to perform, based on the current state information between the target vehicle and the traffic participant of the target vehicle, Monte-Carlo sampling on operation information of the target vehicle and operation information of the traffic participant using an upper confidence bound apply to tree algorithm, to simulate and deduce the interaction process between the target vehicle and the traffic participant to find leaf nodes of the cooperative game tree; and an initial game tree deducing subunit, configured to obtain the initial part of the cooperative game tree based on the root node and the leaf nodes.

In some alternative implementations of this embodiment, the leaf node finding subunit is further configured to: perform, in parallel, starting from the root node, the Monte-Carlo sampling on the operation information of the target vehicle and the operation information of the traffic participant in at least two independently allocated second processing threads based on the current state information between the target vehicle and the traffic participant of the target vehicle that is used as the root node of the cooperative game tree, to simulate and deduce the interaction process between the target vehicle and the traffic participant to obtain leaf nodes corresponding to respective allocated second threads. Here, a combination result of the leaf nodes corresponding to the respective second processing threads refers to the leaf nodes of the cooperative game tree.

In some alternative implementations of this embodiment, the used upper confidence bound apply to tree algorithm is implemented based on an updated upper bound value of the confidence interval, and the updated upper bound value of the confidence interval is determined at least based on a total number of second threads associated with a parent node of a current to-be-decided node and a total number of second threads associated with the current to-be-decided node.

In some alternative implementations of this embodiment, the apparatus 500 further includes: a child node expanding unit, configured to allocate respective independent third processing threads to leaf nodes in the initial part, to find in parallel child nodes of corresponding leaf nodes using the respective third processing threads.

In some alternative implementations of this embodiment, the first control instruction generating unit includes: a control trajectory generating subunit, configured to generate a vehicle control trajectory of the target vehicle using state information corresponding to respective nodes and a deduction path in the complete cooperative game tree; and a control instruction generating subunit, configured to determine a control instruction of the target vehicle based on the vehicle control trajectory, where the control instruction is used to control the target vehicle to achieve the vehicle control trajectory.

In some alternative implementations of this embodiment, the apparatus 500 further includes: a control trajectory updating unit, configured to process the vehicle control trajectory using the iterative linear quadratic regulator algorithm, to generate an updated vehicle control trajectory. The control instruction generating subunit is further configured to: determine the first control instruction of the target vehicle based on the updated vehicle control trajectory. Here, the first control instruction is used to control the target vehicle to achieve the updated vehicle control trajectory.

In some alternative implementations of this embodiment, the control trajectory updating unit includes: a trajectory update position determining subunit, configured to determine a group of update positions for being updated using the iterative linear quadratic regulator algorithm from the vehicle control trajectory; a second thread allocating subunit, configured to respectively allocate an independent fourth processing thread to each of the update positions; a position update result generating subunit, configured to process, in parallel, respective update positions in respective fourth processing threads using the iterative linear quadratic regulator algorithm, to obtain respective position update results; and an updated control trajectory generating subunit, configured to generate the updated vehicle control trajectory based on the respective position update results obtained through the processing in the respective fourth threads.

In some alternative implementations of this embodiment, the complete game tree generating unit 502 includes: an updated predicted trajectory generating subunit, configured to process, in response to there being the target leaf node that is capable of being expanded to obtain the target child node in the initial part, the predicted trajectory from the root node to the target child node using the iterative linear quadratic regulator algorithm, to generate the updated predicted trajectory; and a first complete game tree generating subunit, configured to update, in response to a use evaluation score for the updated predicted trajectory being greater than or equal to a preset score threshold, the respective nodes on the deduction path from the root node to the target child node based on the path parameter of the updated predicted trajectory, to obtain the complete cooperative game tree.

In some alternative implementations of this embodiment, the apparatus 500 further includes: a second complete game tree generating subunit, configured to update, in response to the use evaluation score for the updated predicted trajectory being less than the preset score threshold, the respective nodes on the deduction path from the root node to the target child node based on the path parameter of the predicted trajectory, to obtain the complete cooperative game tree.

In some alternative implementations of this embodiment, the apparatus 500 further includes: a second control instruction generating unit, configured to determine, in response to an absence of the target leaf node in the initial part, a second control instruction of the target vehicle using the initial part, to control the target vehicle using the second control instruction.

This embodiment exists as an apparatus embodiment corresponding to the above method embodiment. According to the apparatus for controlling a vehicle provided in the embodiment of the present disclosure, not only can the decision-making efficiency in the vehicle control process be improved, but also the trajectory planning can be performed more smoothly and with higher quality, thereby improving the control quality of the vehicle.

According to an embodiment of the present disclosure, the present disclosure further provides an electronic device, a readable storage medium and a computer program product.

Figure 6:
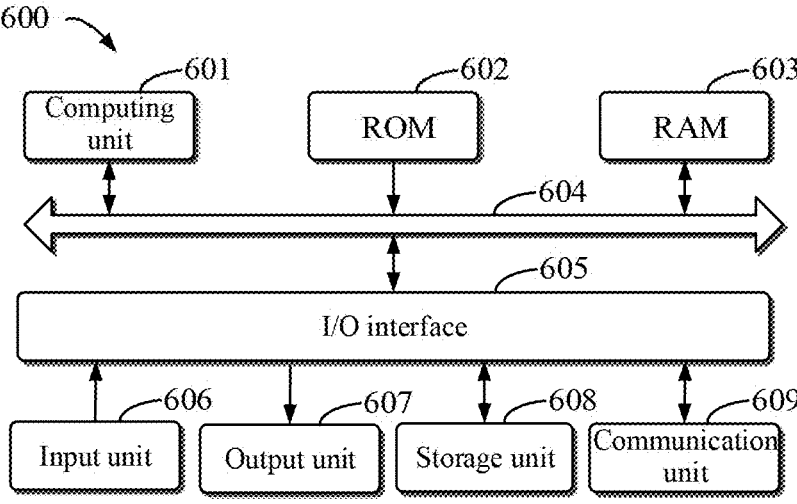
FIG. 6 is a schematic structural diagram of an electronic device adapted to perform the method for controlling a vehicle, provided by an embodiment of the present disclosure.

FIG. 6 shows a schematic block diagram of an example electronic device 600 that may be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device 600 includes a computing unit 601, which may execute various appropriate actions and processes in accordance with a computer program stored in a read-only memory (ROM) 602 or a computer program loaded into a random access memory (RAM) 603 from a storage unit 608. The RAM 603 also stores various programs and data required by operations of the device 600. The computing unit 601, the ROM 602 and the RAM 603 are connected to each other through a bus 604. An input/output (I/O) interface 606 is also connected to the bus 604.

The following components in the electronic device 600 are connected to the I/O interface 606: an input unit 606, for example, a keyboard and a mouse; an output unit 607, for example, various types of displays and a speaker; a storage unit 608, for example, a magnetic disk and an optical disk; and a communication unit 609, for example, a network card, a modem, a wireless communication transceiver. The communication unit 609 allows the device 600 to exchange information/data with an other device through a computer network such as the Internet and/or various telecommunication networks.

The computing unit 601 may be various general-purpose and/or special-purpose processing assemblies having processing and computing capabilities. Some examples of the computing unit 601 include, but not limited to, a central processing unit (CPU), a graphics processing unit (GPU), various dedicated artificial intelligence (AI) computing chips, various processors that run a machine learning model algorithm, a digital signal processor (DSP), any appropriate processor, controller and microcontroller, etc. The computing unit 601 performs the various methods and processes described above, for example, the method for testing a stress based on a cloud service. For example, in some embodiments, the method for testing a stress based on a cloud service may be implemented as a computer software program, which is tangibly included in a machine readable medium, for example, the storage unit 608. In some embodiments, part or all of the computer program may be loaded into and/or installed on the device 600 via the ROM 602 and/or the communication unit 609. When the computer program is loaded into the RAM 603 and executed by the computing unit 601, one or more steps of the above method for testing a stress based on a cloud service may be performed. Alternatively, in other embodiments, the computing unit 601 may be configured to perform the method for controlling a vehicle through any other appropriate approach (e.g., by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, also known as a cloud computing server or cloud host machine, which is a host machine product in the cloud computing service system to solve the problems of difficult management and weak business scalability in traditional physical host machine and virtual private server (VPS) services. The server may also be classified as a distributed system server or a server that combines a blockchain technology.

According to the technical solution of the embodiments of the present disclosure, not only can the decision-making efficiency in the vehicle control process be improved, but also the trajectory planning can be performed more smoothly and with higher quality, thereby improving the control quality of the vehicle.

According to an embodiment of the present disclosure, the present disclosure further provides an unmanned vehicle. The unmanned vehicle may include the above electronic device. An autonomous driving module of the unmanned vehicle includes at least one processor, and a memory connected in communication with the at least one processor. Here, the memory stores an instruction executable by the at least one processor, and the instruction, when executed by the at least one processor, causes the at least one processor to implement at least the method for controlling a vehicle described in FIGS. 2 and 3. The autonomous driving module may further include components such as a traffic light recognition camera, an all-around surround-view camera, a multi-line laser radar, a positioning module (e.g., Beidou, and GPS) and an inertial navigation unit, to perform positioning and environmental information collection to realize the autonomous driving function.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for controlling a vehicle, comprising:
simulating and deducing, based on current state information between a target vehicle and a traffic participant of the target vehicle, an interaction process between the target vehicle and the traffic participant to obtain an initial part of a cooperative game tree, wherein a root node in the initial part corresponds to the current state information;
updating, in response to there being a target leaf node that is capable of being expanded to obtain a target child node in the initial part, respective nodes on a deduction path from the root node to the target child node based on a path parameter of an updated predicted trajectory obtained by processing a predicted trajectory from the root node to the target child node using an iterative linear quadratic regulator algorithm, to obtain a complete cooperative game tree, wherein the complete cooperative game tree is composed of the initial part and the target child node; and
determining a first control instruction of the target vehicle using the complete cooperative game tree, to control the target vehicle using the first control instruction.

2. The method according to claim 1, wherein there are at least two target child nodes obtained through the expansion, and updating the respective nodes on the deduction path from the root node to the target child node based on the path parameter of the updated predicted trajectory obtained by processing the predicted trajectory from the root node to the target child node using the iterative linear quadratic regulator algorithm to obtain the complete cooperative game tree comprises:
allocating respective independent first processing threads to the target child nodes; and
processing, in parallel, respective predicted trajectories from the root node to the target child nodes in respective first processing threads using the iterative linear quadratic regulator algorithm, to generate respective updated predicted trajectories corresponding to the target child nodes.

3. The method according to claim 1, wherein simulating and deducing, based on the current state information between the target vehicle and the traffic participant of the target vehicle, the interaction process between the target vehicle and the traffic participant to obtain the initial part of the cooperative game tree comprises:
performing, based on the current state information between the target vehicle and the traffic participant of the target vehicle, Monte-Carlo sampling on operation information of the target vehicle and operation information of the traffic participant using an upper confidence bound apply to tree algorithm, to simulate and deduce the interaction process between the target vehicle and the traffic participant to find leaf nodes of the cooperative game tree; and
obtaining the initial part of the cooperative game tree based on the root node and the leaf nodes.

4. The method according to claim 3, wherein performing, based on the current state information between the target vehicle and the traffic participant of the target vehicle, the Monte-Carlo sampling on the operation information of the target vehicle and the operation information of the traffic participant using the upper confidence bound apply to tree algorithm, to simulate and deduce the interaction process between the target vehicle and the traffic participant to find the leaf nodes of the cooperative game tree comprises:
performing, in parallel, starting from the root node, the Monte-Carlo sampling on the operation information of the target vehicle and the operation information of the traffic participant in at least two independently allocated second processing threads based on the current state information between the target vehicle and the traffic participant of the target vehicle that is used as the root node of the cooperative game tree, to simulate and deduce the interaction process between the target vehicle and the traffic participant to obtain leaf nodes corresponding to respective allocated second threads, wherein a combination result of the leaf nodes corresponding to the respective allocated second processing threads refers to the leaf nodes of the cooperative game tree.

5. The method according to claim 4, wherein the used upper confidence bound apply to tree algorithm is implemented based on an updated upper value of a confidence interval, and the updated upper value of the confidence interval is determined at least based on a total number of second threads associated with a parent node of a current to-be-decided node and a total number of second threads associated with the current to-be-decided node.

6. The method according to claim 1, further comprising: allocating respective independent third processing threads to leaf nodes in the initial part, to find in parallel child nodes of corresponding leaf nodes using the respective third processing threads.

7. The method according to claim 1, wherein determining the first control instruction of the target vehicle using the complete cooperative game tree, to control the target vehicle using the first control instruction comprises: generating a vehicle control trajectory of the target vehicle using state information corresponding to respective nodes and a deduction path in the complete cooperative game tree; and determining a control instruction of the target vehicle based on the vehicle control trajectory, wherein the control instruction is used to control the target vehicle to achieve the vehicle control trajectory.

8. The method according to claim 7, further comprising: processing the vehicle control trajectory using the iterative linear quadratic regulator algorithm, to generate an updated vehicle control trajectory, wherein determining the control instruction of the target vehicle based on the vehicle control trajectory comprises: determining the first control instruction of the target vehicle based on the updated vehicle control trajectory, wherein the first control instruction is used to control the target vehicle to achieve the updated vehicle control trajectory.

9. The method according to claim 8, wherein the processing the vehicle control trajectory using the iterative linear quadratic regulator algorithm, to generate an updated vehicle control trajectory comprises: determining a group of update positions for being updated using the iterative linear quadratic regulator algorithm from the vehicle control trajectory; allocating respectively an independent fourth processing thread to each of the update positions; processing, in parallel, respective update positions in respective fourth processing threads using the iterative linear quadratic regulator algorithm, to obtain respective position update results; and generating the updated vehicle control trajectory based on the respective position update results obtained through the processing in the respective fourth processing threads.

10. The method according to claim 1, wherein updating, in response to there being the target leaf node that is capable of being expanded to obtain the target child node in the initial part, the respective nodes on the deduction path from the root node to the target child node based on the path parameter of the updated predicted trajectory obtained by processing the predicted trajectory from the root node to the target child node using the iterative linear quadratic regulator algorithm, to obtain the complete cooperative game tree comprises: processing, in response to there being the target leaf node that is capable of being expanded to obtain the target child node in the initial part, the predicted trajectory from the root node to the target child node using the iterative linear quadratic regulator algorithm, to generate the updated predicted trajectory; and updating, in response to a use evaluation score for the updated predicted trajectory being greater than or equal to a preset score threshold, the respective nodes on the deduction path from the root node to the target child node based on the path parameter of the updated predicted trajectory, to obtain the complete cooperative game tree.

11. The method according to claim 10, further comprising: updating, in response to the use evaluation score for the updated predicted trajectory being less than the preset score threshold, the respective nodes on the deduction path from the root node to the target child node based on the path parameter of the predicted trajectory, to obtain the complete cooperative game tree.

12. The method according to claim 1, further comprising: determining, in response to an absence of the target leaf node in the initial part, a second control instruction of the target vehicle using the initial part, to control the target vehicle using the second control instruction.

13. An electronic device, comprising: at least one processor; and a memory, connected in communication with the at least one processor, wherein the memory stores an instruction executable by the at least one processor, and the instruction, when executed by the at least one processor, causes the at least one processor to perform operations, the operations comprising: simulating and deducing, based on current state information between a target vehicle and a traffic participant of the target vehicle, an interaction process between the target vehicle and the traffic participant to obtain an initial part of a cooperative game tree, wherein a root node in the initial part corresponds to the current state information; updating, in response to there being a target leaf node that is capable of being expanded to obtain a target child node in the initial part, respective nodes on a deduction path from the root node to the target child node based on a path parameter of an updated predicted trajectory obtained by processing a predicted trajectory from the root node to the target child node using an iterative linear quadratic regulator algorithm, to obtain a complete cooperative game tree, wherein the complete cooperative game tree is composed of the initial part and the target child node; and determining a first control instruction of the target vehicle using the complete cooperative game tree, to control the target vehicle using the first control instruction.

14. The electronic device according to claim 13, wherein there are at least two target child nodes obtained through the expansion, and updating the respective nodes on the deduction path from the root node to the target child node based on the path parameter of the updated predicted trajectory obtained by processing the predicted trajectory from the root node to the target child node using the iterative linear quadratic regulator algorithm to obtain the complete cooperative game tree comprises:

allocating respective independent first processing threads to the target child nodes; and processing, in parallel, respective predicted trajectories from the root node to the target child nodes in respective first processing threads using the iterative linear quadratic regulator algorithm, to generate respective updated predicted trajectories corresponding to the target child nodes.

15. The electronic device according to claim 13, wherein simulating and deducing, based on the current state information between the target vehicle and the traffic participant of the target vehicle, the interaction process between the target vehicle and the traffic participant to obtain the initial part of the cooperative game tree comprises:

performing, based on the current state information between the target vehicle and the traffic participant of the target vehicle, Monte-Carlo sampling on operation information of the target vehicle and operation information of the traffic participant using an upper confidence bound apply to tree algorithm, to simulate and deduce the interaction process between the target vehicle and the traffic participant to find leaf nodes of the cooperative game tree; and obtaining the initial part of the cooperative game tree based on the root node and the leaf nodes.

16. The electronic device according to claim 15, wherein performing, based on the current state information between the target vehicle and the traffic participant of the target vehicle, the Monte-Carlo sampling on the operation information of the target vehicle and the operation information of the traffic participant using the upper confidence bound apply to tree algorithm, to simulate and deduce the interaction process between the target vehicle and the traffic participant to find the leaf nodes of the cooperative game tree comprises:

performing, in parallel, starting from the root node, the Monte-Carlo sampling on the operation information of the target vehicle and the operation information of the traffic participant in at least two independently allocated second processing threads based on the current state information between the target vehicle and the traffic participant of the target vehicle that is used as the root node of the cooperative game tree, to simulate and deduce the interaction process between the target vehicle and the traffic participant to obtain leaf nodes corresponding to respective allocated second threads, wherein a combination result of the leaf nodes corresponding to the respective allocated second processing threads refers to the leaf nodes of the cooperative game tree.

17. The electronic device according to claim 16, wherein the used upper confidence bound apply to tree algorithm is implemented based on an updated upper value of a confidence interval, and the updated upper value of the confidence interval is determined at least based on a total number of second threads associated with a parent node of a current to-be-decided node and a total number of second threads associated with the current to-be-decided node.

18. The electronic device according to claim 13, wherein the operations further comprise:

allocating respective independent third processing threads to leaf nodes in the initial part, to find in parallel child nodes of corresponding leaf nodes using the respective third processing threads.

19. The electronic device according to claim 13, wherein determining the first control instruction of the target vehicle using the complete cooperative game tree, to control the target vehicle using the first control instruction comprises:

generating a vehicle control trajectory of the target vehicle using state information corresponding to respective nodes and a deduction path in the complete cooperative game tree; and determining a control instruction of the target vehicle based on the vehicle control trajectory, wherein the control instruction is used to control the target vehicle to achieve the vehicle control trajectory.

20. An unmanned vehicle, comprising an electronic device, the electronic device, comprising:

at least one processor; and a memory, connected in communication with the at least one processor, wherein the memory stores an instruction executable by the at least one processor, and the instruction, when executed by the at least one processor, causes the at least one processor to perform operations, the operations comprising:

simulating and deducing, based on current state information between a target vehicle and a traffic participant of the target vehicle, an interaction process between the target vehicle and the traffic participant to obtain an initial part of a cooperative game tree, wherein a root node in the initial part corresponds to the current state information;

updating, in response to there being a target leaf node that is capable of being expanded to obtain a target child node in the initial part, respective nodes on a deduction path from the root node to the target child node based on a path parameter of an updated predicted trajectory obtained by processing a predicted trajectory from the root node to the target child node using an iterative linear quadratic regulator algorithm, to obtain a complete cooperative game tree, wherein the complete cooperative game tree is composed of the initial part and the target child node; and determining a first control instruction of the target vehicle using the complete cooperative game tree, to control the target vehicle using the first control instruction.

\* \* \* \* \*